United States Patent
Mason

(10) Patent No.: US 9,249,875 B1
(45) Date of Patent: Feb. 2, 2016

(54) METHOD AND APPARATUS FOR PROVIDING CONTINUOUS COOLER FLOW IN VEHICULAR TRANSMISSIONS

(71) Applicant: Superior Transmission Parts, Inc., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 234 days.

(21) Appl. No.: 14/061,913

(22) Filed: Oct. 24, 2013

Related U.S. Application Data

(60) Provisional application No. 61/718,105, filed on Oct. 24, 2012.

(51) Int. Cl.
  *F16H 57/04* (2010.01)
  *F16K 17/04* (2006.01)
(52) U.S. Cl.
  CPC ........ *F16H 57/0413* (2013.01); *F16H 57/0435* (2013.01); *F16K 17/04* (2013.01)
(58) Field of Classification Search
  CPC .. F16K 17/04; F16H 57/0435; F16H 57/0413
  USPC .......... 180/339; 74/606 A; 184/6.12
  See application file for complete search history.

(56) References Cited

U.S. PATENT DOCUMENTS

| | | | | |
|---|---|---|---|---|
| 5,564,317 A | * | 10/1996 | Gilroy | F16H 57/0413 137/565.35 |
| 6,499,666 B1 | * | 12/2002 | Brown | F01M 5/007 236/34.5 |
| 6,935,569 B2 | * | 8/2005 | Brown | F01M 5/007 236/34.5 |
| 8,033,197 B2 | * | 10/2011 | Larson | B64C 13/04 384/517 |
| 2007/0164123 A1 | * | 7/2007 | Willers | G05D 23/022 236/93 R |
| 2010/0126594 A1 | * | 5/2010 | Sheppard | F01P 7/16 137/340 |
| 2013/0139906 A1 | * | 6/2013 | Neelakantan | F16K 11/07 137/334 |

* cited by examiner

*Primary Examiner* — Ruth Ilan
(74) *Attorney, Agent, or Firm* — Dowell & Dowell, PC

(57) ABSTRACT

An apparatus and method of providing a continuous flow of discharge transmission fluid from a torque converter to a cooler of a vehicle transmission such that oil flow to the cooler begins at engine start up and wherein the apparatus includes a safety bypass valve that directs discharge from the torque converter directly to a lube circuit other, than the cooler circuit, in the event pressure within the cooler circuit rises above a predetermine pressure due to a gelling of lubricant oil or other clogging of the cooler circuit.

11 Claims, 7 Drawing Sheets

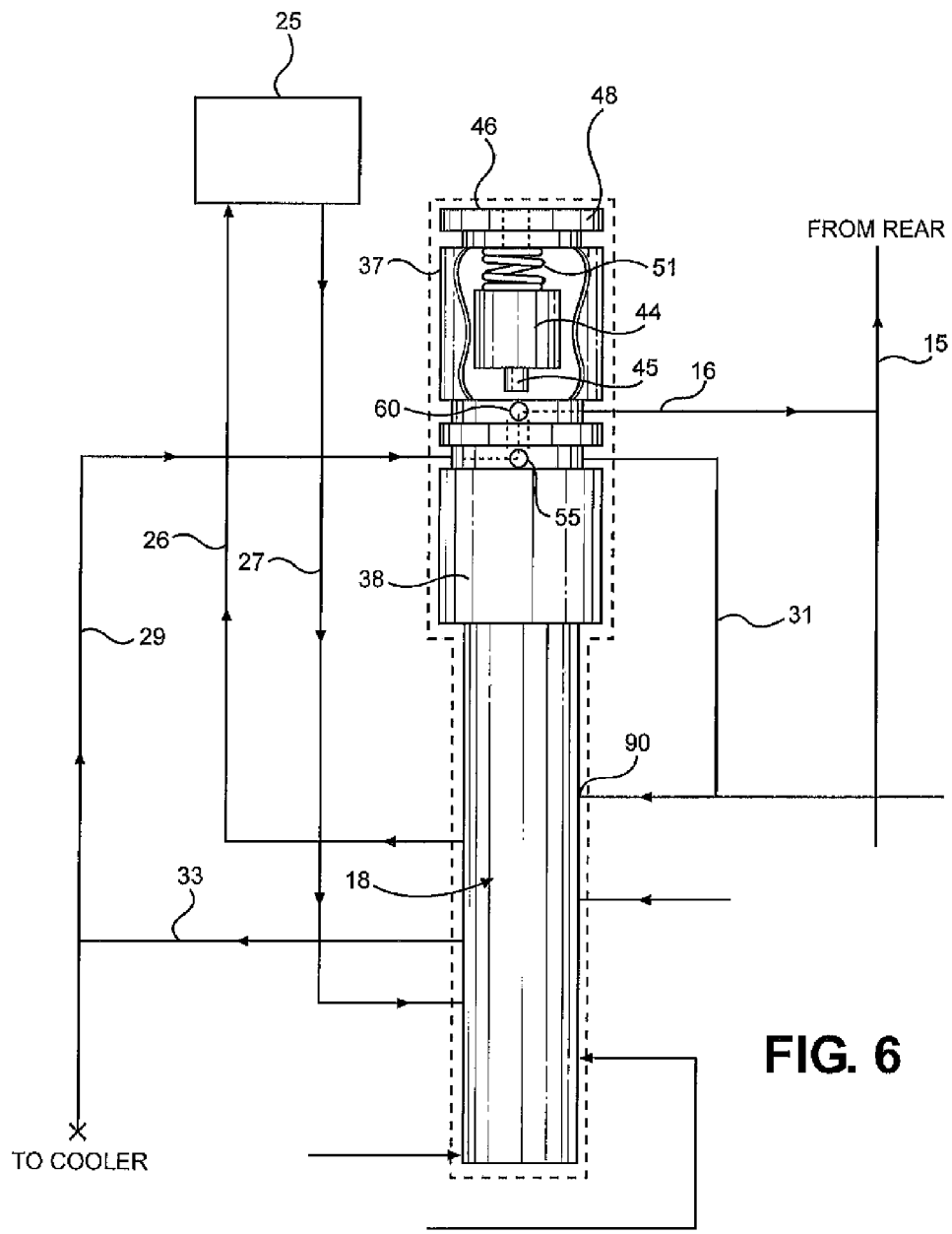

METHOD AND APPARATUS FOR PROVIDING CONTINUOUS COOLER FLOW IN VEHICULAR TRANSMISSIONS

BACKGROUND OF THE INVENTION

1. Field of the Invention

The present invention is directed to the field of vehicle transmissions and more particularly to an apparatus and method of providing a continuous flow of discharge transmission fluid from a torque converter to a cooler of the transmission such that oil flow to the cooler begins at engine start up and wherein the apparatus includes a safety bypass valve that directs discharge from the torque converter directly to a lube circuit other than the cooler circuit in the event pressure within the cooler circuit rises above a predetermine pressure due to a gelling of lubricant oil or other clogging of the cooler circuit.

2. Brief Description of the Related Art

In some models of vehicles, lubricant oil flow through an automatic transmission is controlled such that, until a temperature of the oil or transmission fluid reaches a predetermined temperature after vehicle start up, the oil is allowed to bypass a cooler circuit associated with the automatic transmission. By way of example, transmissions of the Ford® 5R55 series such as the W, S and N models, are provided with a cooler bypass valve controlled by a thermostatic switch as original operating equipment. Such a thermostatically controlled valve is a directional flow control valve having a valve body that moves so as to either prevent or allow flow of oil from a transmission torque converter to the cooler circuit. Essentially, the thermostatic switch includes a piston which shifts the valve from a first position, to block flow to the cooler circuit when the temperature of the oil is below a predetermine temperature so that all oil is directed to a lube circuit of the transmission, to a second position when the oil temperature is above the predetermined temperature so that the oil is directed toward the cooler circuit. At low temperatures, the bypass valve is urged by a spring to close an outlet to prevent flow to the cooler circuit, however, as the temperature rises to approximately 160° F., the thermostat urges the valve against the spring pressure such that heated oil is directed to the cooler circuit.

It has been determined that the thermostatic bypass valve assembly may fail to operate to open the bypass valve until temperatures of the transmission fluid or oil become damagingly high causing failure or lock up of the gears of the transmission. In the event of failure of the bypass valve to open in a proper manner, the overdrive sun and planet gears are normally the first gears to be adversely effected as they generally receive the least amount of oil flow during engine operation.

In addition to the foregoing, under normal operating conditions, the Ford® transmissions identified above are designed to provide maximum flow of approximately 0.7 gallons of lubricant in 20 seconds to the cooling circuit when the bypass valve is opened to direct flow to the cooling circuit. As only a small amount of the cooled lubricant is directed to the overdrive planetary gears, any overheating caused by failure of the cooler bypass valve or a delay in opening of the cooler bypass valve to the cooler circuit will have a generally immediate effect on such gears.

In view of the foregoing, there is a need to prevent potential damage that may be caused to vehicle transmissions due to failure or faulty operation of thermostatically controlled bypass valves. There is also a need to increase the quantity of lubrication fluid flow to the overdrive sun and planetary gears to ensure that such gears are not easily damaged upon heat build up.

SUMMARY OF THE INVENTION

The present invention is directed to a continuous cooler flow and safety bypass valve system that replaces thermostatically controlled cooler circuit bypass valves associated with vehicle transmissions such as the Ford® 5R55 transmissions including the W, S and N models. The safety bypass valve system includes a stationary sleeve having first and second end portions separated by a intermediate of central portion. The sleeve includes at least one open flow channel for continuously supplying oil or transmission fluid being discharged from the torque converter to the transmission cooler circuit so that the cooler circuit is not bypassed at low operating temperatures, as is the case with the conventional transmissions. In addition, the first end portion includes a valve chamber in which a safety blow-off valve is reciprocally movable relative to a flow passage opening in the intermediate portion of the sleeve. The safety valve is normally biased to close the flow passage opening to prevent flow into the valve chamber. The sleeve also includes at least one and preferably a plurality inlet openings for communication fluid with the flow passage opening. Upon build up of pressure within the inlet openings, the safety valve is forced open allowing flow into the valve chamber. The fluid within the valve chamber is exhaust through discharge of openings in the sleeve by way of which oil being discharged from the converter clutch is directed to the lube circuit in the event the liquid in the cooler circuit gels under extremely low ambient temperatures or the cooler circuit otherwise becomes partially or totally blocked.

In the preferred embodiment, the at least one inlet opening and the at least one discharge opening are separated by a land that blocks direct communication between the inlet and outlet. Further, the inlet and outlet openings may be made in the intermediate portion of the sleeve. The safety blow-off valve may be in the form of a cylindrical piston or ball valve which is continuously urged by a spring or other resilient member to a closed position to block flow to a lube circuit under normal operating conditions. However, should pressure within the converter out/cooler circuit rise above a predetermined level, such as 60 psi, the bypass valve will be forced against the resilient member to open flow from the torque converter directly to the lube circuit of the transmission.

In the embodiments shown, the fluid inlets and discharge outlets are formed with annual flow passage recesses formed in spaced relation with one another and preferably within the intermediate portion of the sleeve.

To further facilitate the operation of the transmission using the cooler circuit valve system of the invention, it is recommended that other components of the transmission be altered. Such alterations or modifications to the transmission include removal of the conventional dump ball valve to provide increased and parallel lubricant flow to the three lube circuits of the transmission including the rear, center and front lube circuits which will result in up to a 300% increase in lubricant flow to the cooler circuit. In addition, an orifice in the converter control valve which normally supplies converter discharge lubricant to a converter back pressure valve should be plugged so as to maintain pressure and flow within the lube circuits.

Another modification to the transmission that should be made upon installation of the valve system of the present invention is to enlarge a front lube cup orifice in a pump stator of the transmission in order to increase lubricant flow through the pump. Also, drilling holes in the overdrive sun gear drive plate to direct lubricant flow directly to the overdrive planetary carrier will facilitate the supply of lubricant to the overdrive planetary gears so as to prevent burn out damage to the planetary gears which are the most susceptible to damage when temperatures within the lube circuits increase to an above normal operating temperature due to valve or other components failures within the transmission.

It is the primary object of the present invention to overcome the problems associated with lockup or other damage to components and gears within a transmission and especially the overdrive sun and planet gears of transmissions due to failure of thermostatically controlled converter/cooler circuit flow valves by providing a valve system which replaces the thermostatic element and valve member of such valves with a combination stationary sleeve and cooler circuit bypass valve which functions to normally provide a continuous flow of converter discharge lubricant to the cooler circuit even at start up low temperatures but which will automatically open to bypass the discharge flow directly to the lube circuits of the transmission in the event liquid in the cooler circuit thickens or gels due to extremely low ambient temperatures or otherwise becomes blocked.

It is another object of the present invention to increase lubricant supply to the sun and planet gears within a vehicle transmission by modifying components of the transmission and specifically providing holes in the overdrive sun gear drive plate to direct lubricant flow directly to the planetary carrier and to enlarge the front lube cup orifice in the pump stator to increase front lube circuit flow.

It is also an object of the invention to maximize flow within the three lubrication circuits of the transmission by removing the conventional dump ball valve and blocking an orifice in the converter control valve which normally supplies converter discharge lubricant to a converter clutch back pressure valve which flow is normally necessary to maintain pressures in the lube circuit above zero when the conventional thermostatically controlled valve opens to the cooler circuit by which is no longer necessary with the continuous flow to the cooler circuit of the present invention.

BRIEF DESCRIPTION OF THE DRAWINGS

A better understanding of the invention will be had with reference to the accompanying drawings wherein:

FIG. 6 is a fluid circuit including a top plan view having portions broken away of the stationary sleeve and safely bypass valve with the valve being open to direct discharge toward the rear lube circuit when pressures within the cooler circuit rise above a predetermined level;

DESCRIPTION OF THE PREFERRED
EMBODIMENTS

Figure 1:
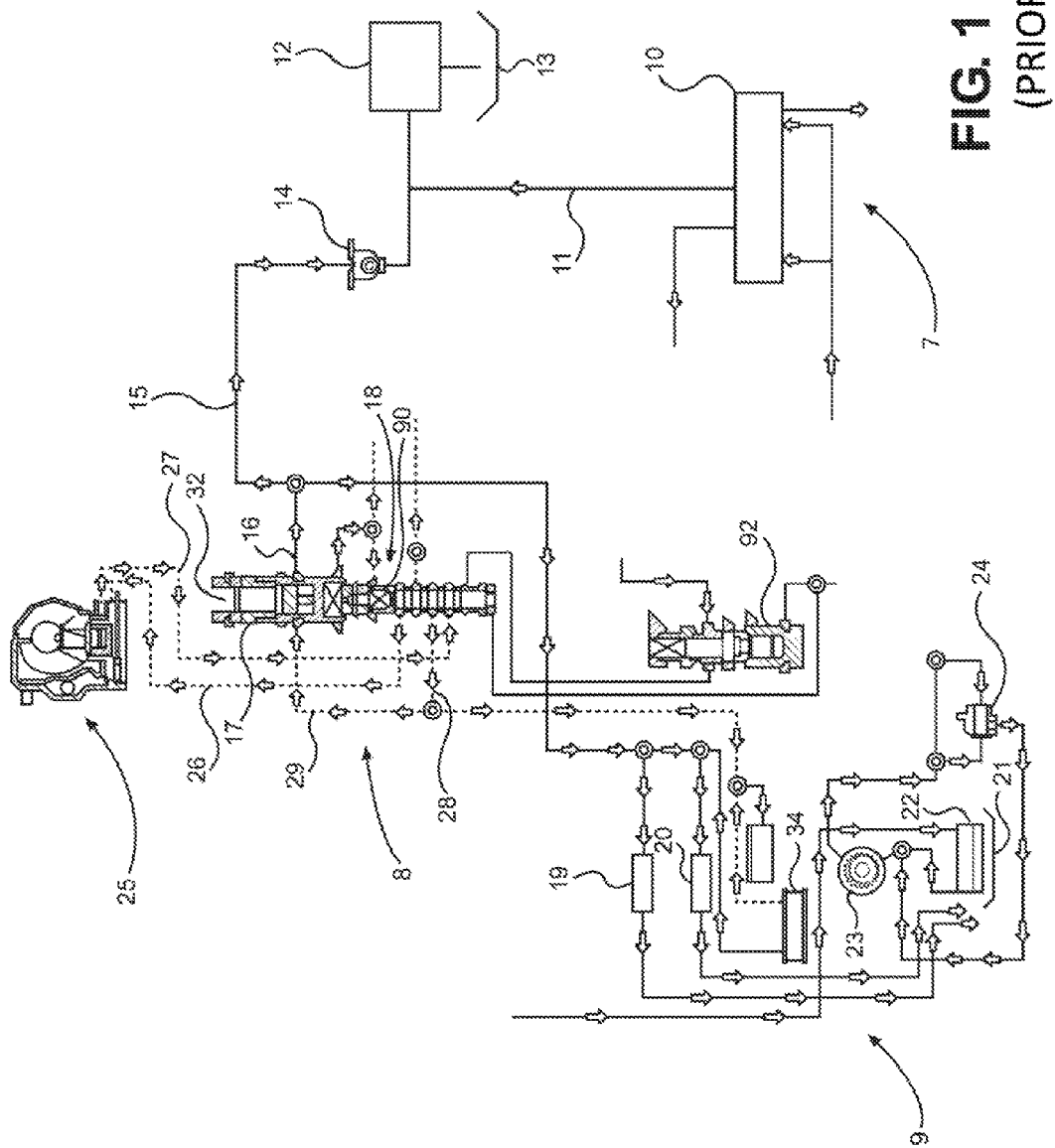
FIG. 1 is a flow diagram showing a torque converter, thermostatically controlled bypass valve assembly and cooler circuit of a conventional Ford® 5R55 transmission showing transmission fluid flow prior to opening of flow between the torque converter to the cooler circuit.
Figure 2:
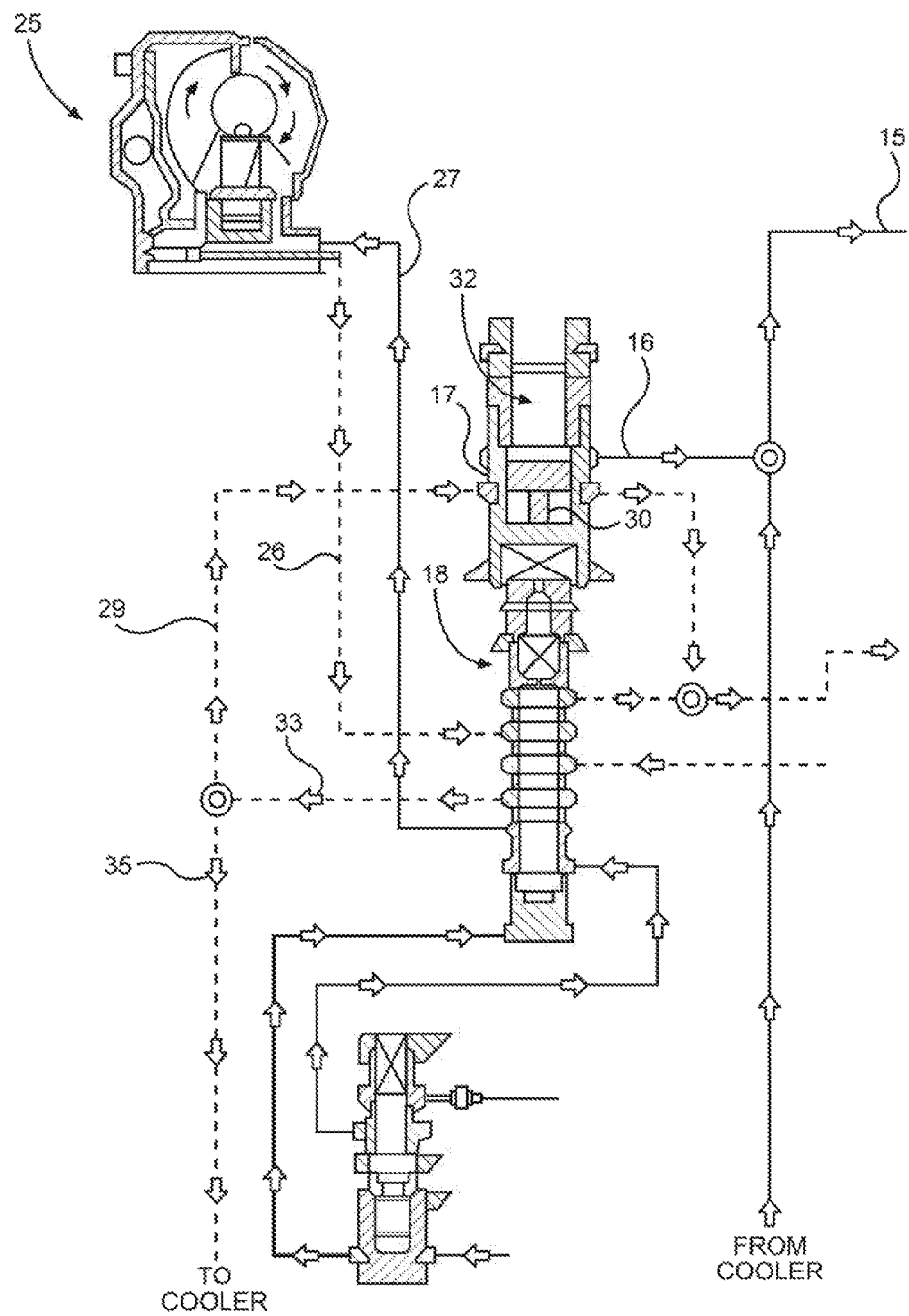
FIG. 2 is a flow diagram similar to FIG. 1 showing transmission fluid flow to the cooler circuit from the torque converter upon opening of the bypass valve.

With particular reference to FIGS. 1 and 2, portions of the fluid circuit diagrams of a conventional Ford® 5R55 series transmission are shown. These portions show a main regulator valve section 7, a torque converter and converter control valve section 8 and a cooler/filter section 9. The main regulator valve section includes a main regulator bypass valve 10 which discharges to a bypass 11 to a rear lube circuit 12 including a sump 13. The sump 13 is also connected to receive lubricant cooling oil, or transmission fluid, through a one way ball check valve 14 from a fluid line or channel 15 that connects to an outlet 16 of a thermostatically operated cooler bypass valve 17 of a converter control valve assembly 18 and to the transmission center and front lube circuits 19 and 20 which are connected to supply another sump 21. Transmission fluid from the sump 21 is drawn through a filter 22 and forwarded by a pump 23 to a flow control valve 24 to the center and front lube transmission circuits. The converter control valve assembly 18 controls flow of transmission fluid to and from a transmission torque converter 25 through channels 26 and 27. At low transmission fluid operating temperatures below approximately 160° F., the discharge from the converter 25 is directed through the control valve assembly 18 to channels 28 and 29 to the thermostatic cooler bypass valve 17 where the fluid exits outlet 16 and flows into channel 15 toward the rear sump 13 and/or the center and front lube circuits 19 and 20. However, as the temperature of the transmission fluid rises above approximately 160° F., a piston 30 of a thermostat 32 of the cooler bypass valve assembly, see FIG. 2, extends outwardly and urges valve 17 to a second position so as to block flow to the discharge 16 of the valve and instead directs fluid discharging from the converter to a cooler 34. Discharge from the torque converter 25 is thus discharged to an inlet of the converter control valve 18 through line 26 and then from an outlet of the converter control valve to line 33 and channel or line 35. It should be noted that the one way ball check valve 14 is provided to permit fluid flow from the thermostatic cooler bypass valve 17 to the rear lube circuit but prevent flow from the exhaust from the main regulator valve 10 toward the thermostatic cooler bypass valve 17.

As set forth above with respect to the conventional thermostatic bypass valve assemblies, often the thermostat element fails to operate until the transmission fluid heats up to as much as 300° F. which can result in damage throughout the transmission and especially to the overdrive sun and planet gears thereby locking up the transmission. Thus there is a need to replace such conventional thermostatic valves.

Figure 3:
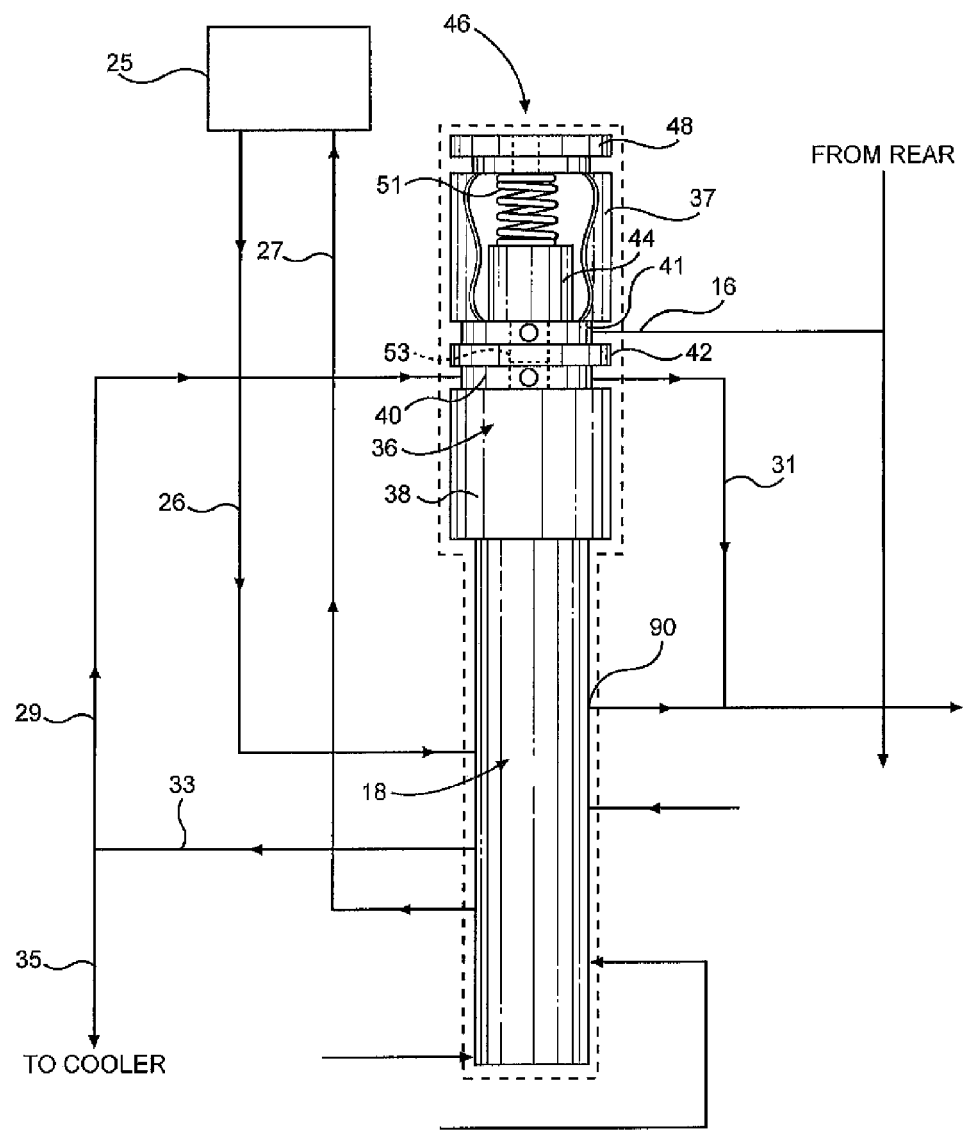
FIG. 3 is a flow diagram showing generally continuous transmission fluid flow between the torque converter and the cooler circuit through a continuous feed sleeve when a safety bypass valve associated with the sleeve is closed in accordance with the teachings of the present invention.

With specific reference to FIGS. 3 to 7, a continuous cooler sleeve and safety bypass flow valve assembly 36 of the present invention is shown and its operating characteristics are set forth herein. In accordance with the invention and as shown in FIG. 3, the continuous cooler sleeve and safety bypass valve assembly 36 replaces the thermostat 32 and cooler bypass valve 17 and thus is compatible in size and dimension to seat within the fluid circuit of the transmission in place of the conventional bypass valve 17 and thermostat 32. The continuous cooler sleeve and safety bypass flow control valve 36 is structured to connect or communicate the discharge side of the torque converter 25 at all times with the cooler 34 such that transmission fluid is conducted to the cooler even at low operating temperatures below 160° F. The continuous cooler feed circuit is shown in FIG. 3 wherein no flow is directed to the discharge circuit 16 to line 15 communicating with the rear lube circuit. The flow through the cooler sleeve and safety bypass valve assembly 36 will always be as shown in FIG. 3 unless pressures within the fluid circuit increase above a predetermined pressure due to gelling of the transmission fluid at extremely low ambient temperatures or due to some other problem in the cooler circuit. If the pressure does rise, a safety pass valve associated with the cooler sleeve and safety bypass valve assembly will open to direct fluid flow to the rear lube circuit through discharge line 16, as is shown in FIG. 6.

Figure 4:
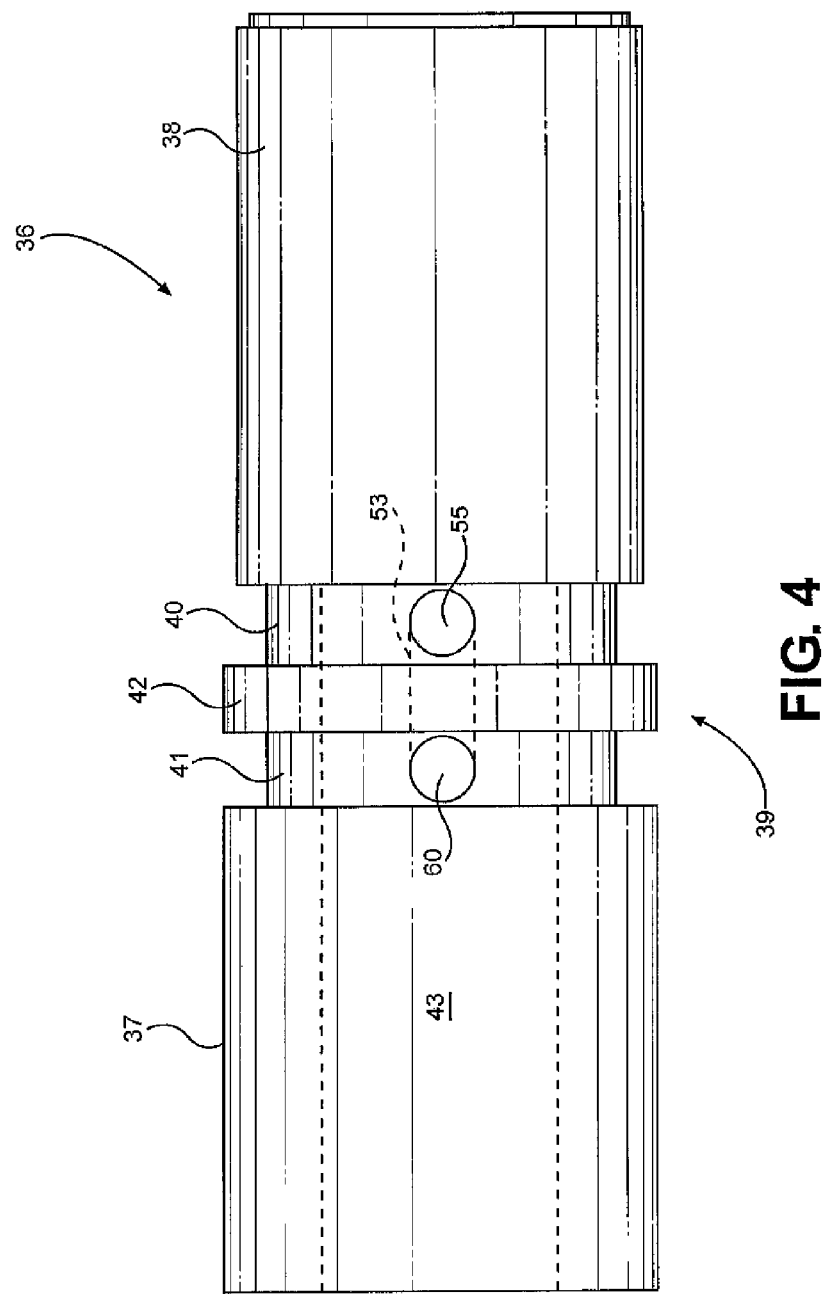
FIG. 4 is an enlarged top plan view of one embodiment of continuous flow directing stationary sleeve and safety bypass valve of the present invention having an end plug removed.
Figure 5:
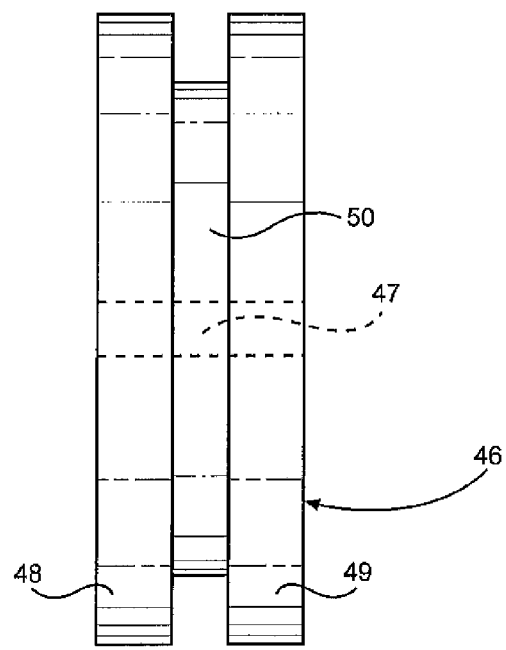
FIG. 5 is a top plan view of an end plug of the stationary sleeve of FIG. 4.
Figure 7:
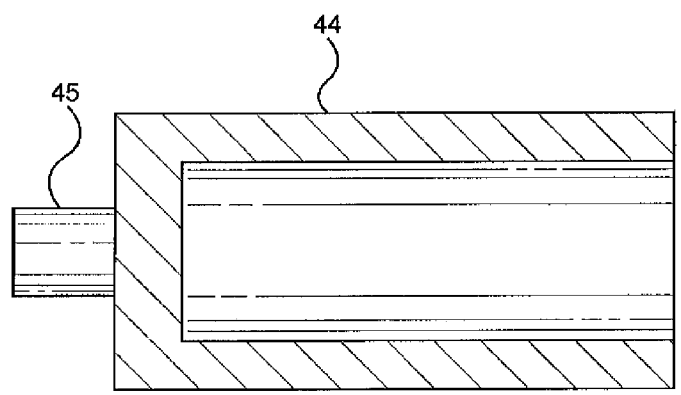
FIG. 7 is a cross section taken through the safety valve shown in FIGS. 3 and 6.

With reference to FIGS. 4, 5 and 7, the continuous cooler sleeve and safety bypass valve assembly 36 include a generally cylindrical stationary sleeve including first and second portions 37 and 38 which extend from a central portion 39 including a recessed annular fluid inlet 40 and a recessed annular fluid outlet 41 which are separated by an outwardly extending land or annular flange 42. Sleeve portion 37 is hollow defining a valve chamber 43 in which a safety bypass valve 44 is seated. The bypass valve is shown as being a hollow cylindrical valve, see FIG. 7, which is closed at one end from which a central post 45 extends toward the central portion of the assembly. The open end of the sleeve portion 37 partially closed by a plug member 46 shown in FIG. 5. The plug member has a through opening 47 formed there through to allow fluid pressures to be adjusted within the valve chamber 43. The plug 46 includes two spaced outwardly extending annular flanges 48 and 49 having a recessed annular groove 50 formed there between. After the safety bypass valve 44 is placed within the valve chamber, a spring, such as coil spring 51 is placed within the chamber to continuously urge the safety bypass valve 44 toward a closed position wherein the post 45 seats within and closes a central opening 53 formed through the central portion of assembly 36. With the spring in place, the plug 46 is sealed such that land 49 is mounted within the hollow portion of the first portion of the continuous cooler sleeve and safety bypass valve assembly 36. The recessed annular groove 50 is designed to receive a u-shaped locking spring, not shown, for securing the valve assembly 36 within a transmission housing.

The annular fluid inlet 40 has at least one and preferably a plurality of spaced openings 55 therein through which transmission fluid may flow through the opening 53 in the central portion of the assembly 36 and into the safety valve chamber 43 when pressure exceeds a predetermined pressure in the cooler fluid circuit. The reduced diameter fluid inlet 40 forms a continuously open fluid flow path 56 by way of which discharge fluid from the torque converter 25 flows to the channels 33 and 35, see FIG. 3, by way of which the continuous cooler sleeve and safety bypass flow control valve 36 connects to the cooler.

The annular fluid outlet 41 has at least one and preferably a plurality of spaced fluid outlets or discharge openings 60 formed through the annular wall for communicating the inner valve chamber 43 with the fluid outlet 16 to the lube circuit or channel 15.

The bypass valve 44 acts as a bypass member to channel discharge fluid from the converter directly to the fluid channel 15 of the transmission in the event pressure of the discharge fluid rises above a predetermined pressure, such as above 60 psi. Under normal operation, the central post 45 of the valve 43 seats within and plugs the opening 53 through the central portion thus preventing fluid flow from the annular inlet 40 of the central portion to the valve chamber 43 of the first sleeve portion of the continuous cooler sleeve and safety bypass valve 36. The fluid circuit and valve position are shown in FIG. 3.

However, with reference to FIG. 6, should the pressure rise above the predetermined pressure in the cooler circuit or converter discharge or should the cooler or cooler flow channels become plugged, such as may occur at very low ambient temperatures wherein the transmission fluid may become gelled, the valve 44 is forced against the biasing spring 51 such that the valve post 45 opens the opening 53 in the central portion 39. Under these conditions, the transmission fluid will pass from the discharge of the torque convert 25 into the valve chamber 43 of the first sleeve portion and flow outwardly through the outlet openings 60 to the discharge circuit 16 toward the transmission rear lube circuit. Once pressure within the continuous cooler sleeve and safety bypass valve 36 drops below the predetermined pressure, valve 44 will be urged to its closed position by the spring 51 such that the post 45 thereof plugs the opening 53 in the central portion and flow to the cooler is immediately returned. It should be noted that a ball valve may be used as opposed to the cylindrical valve with post to open and close the opening 53.

It should be noted that the plug 55 that closes the open end of the first sleeve portion may be formed as one piece with the first sleeve as opposed to being joined to the first sleeve portion.

Figure 8:
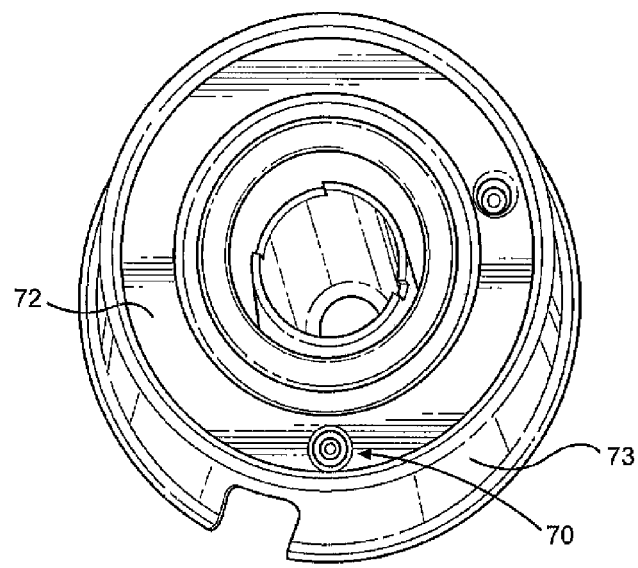
FIG. 8 is an enlarged front perspective view of a front lube orifice in a cup plug of the inside of a pump stator of the transmission of FIG. 1.
Figure 9:
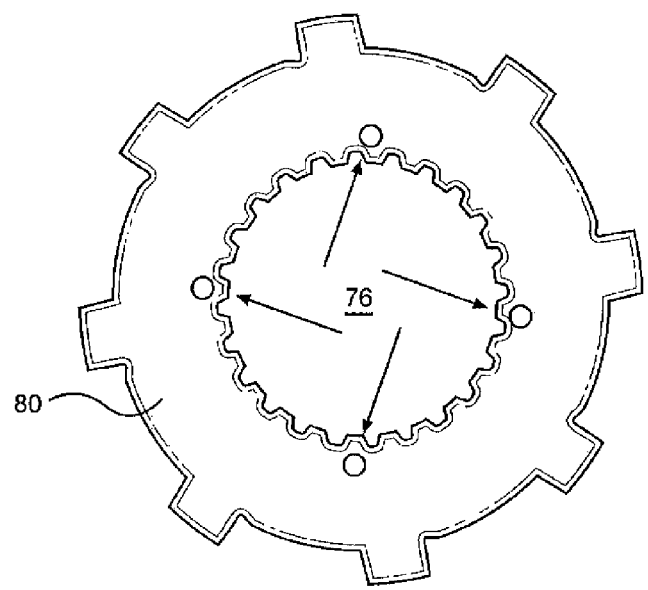
FIG. 9 is a top view showing a plurality of holes made in the overdrive direct drum to planetary sun gear drive plate to promote lubricant flow to the planetary carrier.

When replacing the conventional thermostatic cooler bypass valve with the continuous cooler sleeve and safety bypass flow control valve 36, and in order to balance operating pressures within the transmission lube circuits, the check ball valve 14 is removed such that transmission oil may flow in both directions through the valve housing. In addition, an input orifice 90 in the converter control valve assembly 18 which normally supplies converter discharge lubricant to a converter back pressure valve 92 is plugged so as to maintain pressure and flow within the lube circuits. Also, with reference to FIG. 8, a front lube orifice 70 within the convention cup plug 72 of the pump stator 73 of the transmission should be enlarged using a $1/8^{th}$ inch drill bit so as to further promote movement of oil to the overdrive components. In addition, a plurality of holes, such as four $3/32^{nd}$ Inch Diameter Holes 76, should be drilled through the overdrive drum to planetary sun gear drive plate 80, see FIG. 9, in order to facilitate transmission fluid flow to the overdrive planetary gears. By making the foregoing modifications to the other parts of the Ford 5R55 series transmissions, it is estimated that up to approximately four times the oil supply to the overdrive planetary gears is achieved over the originally equipped transmissions thereby preventing planetary burnout in the overdrive gearing.

I claim:

1. A continuous cooler sleeve and safety bypass flow control valve for use in vehicle transmissions to replace a conventional thermostatically controlled transmission cooler bypass valve, the continuous cooler sleeve and safety bypass flow control valve comprising a sleeve having first and second end portions separated by a central portion, at least said first end portion being generally hollow and defining a valve chamber in which a valve is movable mounted, the sleeve having at least one continuously open channel therein for permitting unobstructed flow from one side of the sleeve to an opposite side thereof, the central portion having a flow passage opening therein, at least one radially extending opening communicating with the at least one open channel to the flow passage opening, a biasing spring mounted within the valve chamber for continuously urging the valve to normally close the flow passage opening through the central portion and at least one discharge opening in the sleeve for communicating the valve chamber with an exterior portion of the sleeve such that when the valve is opened relative to the flow passage opening by fluid pressure within exceeding a force of the biasing spring against the valve, fluid flows along the at least one continuously open channel and through the at least one radially extending opening and through the flow passage opening into the valve chamber and outwardly of the valve chamber through the at least one discharge opening in the sleeve.

2. The continuous cooler sleeve and safety bypass flow control valve for use in vehicle transmissions of claim 1 wherein the at least one continuously open channel is formed as a first annular inset channel relative to outer cylindrical walls of the sleeve and the at least one opening being formed within the annular inset channel.

3. The continuous cooler sleeve and safety bypass flow control valve for use in vehicle transmissions of claim 2 wherein the at least one discharge opening is formed within a second annular inset channel formed in the sleeve.

4. The continuous cooler sleeve and safety bypass flow control valve for use in vehicle transmissions of claim 3 wherein the at least one radially extending opening includes a plurality of spaced radially extending openings in the first annular inset channel and wherein the at least one discharge opening includes a plurality of spaced discharge openings in the second annular inset channel.

5. The continuous cooler sleeve and safety bypass flow control valve for use in vehicle transmissions of claim 4 wherein an outwardly extending annular flange is provided between the first and second annular inset channels.

6. The continuous cooler sleeve and safety bypass flow control valve for use in vehicle transmissions of claim 5 wherein the first and second annular inset channels are formed within the central portion of the sleeve.

7. The continuous cooler sleeve and safety bypass flow control valve for use in vehicle transmissions of claim 1 wherein an outwardly extending annular land is provided between the at least one continuously open channel and the at least one discharge opening of the sleeve.

8. The continuous cooler sleeve and safety bypass flow control valve for use in vehicle transmissions of claim 1 including an annular recessed area provided adjacent an end of the first end portion of the sleeve for receiving a locking clip.

9. A method of modifying a vehicle transmission to replace a thermostatic cooler bypass valve, the method including the steps of:
   A. Replacing the thermostatic cooler bypass valve with the continuous cooler sleeve and safety bypass flow control valve of claim 1, and
   B. Removing a dump ball valve from a fluid circuit extending between a rear lube sump and the at least one discharge opening of the sleeve of the continuous cooler sleeve and safety bypass flow valve of claim 1.

10. The method of claim 9 including the additional step of:
   C. Plugging an orifice in a converter control valve which normally supplies converter discharge lubricant to a converter back pressure valve so as to maintain pressure and flow within lube circuits.

11. The method of claim 9 including an additional step of:
   D. Drilling a plurality of holes in an overdrive drum to a planetary sun gear drive plate of the transmission.

* * * * *